United States Patent
Burjoski (10) Patent No.: US 8,515,907 B2
(45) Date of Patent: *Aug. 20, 2013

(54) APPARATUS, AND ASSOCIATED METHOD, FOR SYNCHRONIZING DIRECTORY SERVICES

(75) Inventor: Joseph Daniel Burjoski, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/600,608

(22) Filed: Aug. 31, 2012

(65) Prior Publication Data

US 2012/0323847 A1 Dec. 20, 2012

Related U.S. Application Data

(63) Continuation of application No. 12/766,878, filed on Apr. 24, 2010, now Pat. No. 8,290,900.

(51) Int. Cl.
*G06F 17/30* (2006.01)

(52) U.S. Cl.
USPC ........................................... 707/610; 707/956

(58) Field of Classification Search
CPC .................... G06F 17/30575; G06F 17/30286; G06F 17/30067
USPC .................................. 707/610, 999.201, 956
See application file for complete search history.

(56) References Cited

U.S. PATENT DOCUMENTS

| | | | |
|---|---|---|---|
| 5,220,604 A | 6/1993 | Gasser et al. | |
| 5,878,434 A | 3/1999 | Draper et al. | |
| 5,991,771 A | 11/1999 | Falls et al. | |
| 6,052,724 A | 4/2000 | Willie et al. | |
| 6,581,074 B1* | 6/2003 | Wong et al. | 1/1 |
| 6,662,191 B1 | 12/2003 | Cherniavsky et al. | |
| 6,947,942 B1* | 9/2005 | Wu et al. | 1/1 |
| 6,986,039 B1 | 1/2006 | Leah et al. | |
| 7,054,955 B2* | 5/2006 | Chen et al. | 709/248 |
| 7,349,913 B2 | 3/2008 | Clark et al. | |
| 7,483,915 B2* | 1/2009 | Thompson et al. | 1/1 |
| 7,620,658 B2* | 11/2009 | Benson et al. | 1/1 |
| 7,673,047 B2 | 3/2010 | Delany et al. | |
| 7,761,412 B2* | 7/2010 | Talius et al. | 707/610 |
| 2002/0129135 A1 | 9/2002 | Delany et al. | |
| 2002/0138572 A1 | 9/2002 | Delany et al. | |
| 2003/0005161 A1* | 1/2003 | Chen et al. | 709/248 |

(Continued)

FOREIGN PATENT DOCUMENTS

WO 2005/024552 A2 3/2005

OTHER PUBLICATIONS

HP ProCurve, "Synchronizing ProCurve IDM and Windows Active Directory", An HP ProCurve Networking Application Note, Jul. 2008, 10 pages.*

(Continued)

*Primary Examiner* — Phuong Thao Cao (57) ABSTRACT

An apparatus, and an associated method, synchronizes directory services based on group membership. A synchronization scope is defined by the group membership to a specified nesting level of nestable groups. Groups within the synchronization scope are fetched and de-nested. And, once fetched, the members of the fetched and de-nested groups are fetched. The fetched object names are used to update the destination directory service.

20 Claims, 8 Drawing Sheets

(56) References Cited

U.S. PATENT DOCUMENTS

| | | | |
|---|---|---|---|
| 2003/0078937 | A1 | 4/2003 | Boreham et al. |
| 2003/0126137 | A1 | 7/2003 | McFadden |
| 2004/0075688 | A1 | 4/2004 | Cortesi et al. |
| 2004/0117386 | A1* | 6/2004 | Lavender et al. ............ 707/100 |
| 2004/0117666 | A1* | 6/2004 | Lavender et al. ............ 713/202 |
| 2004/0117667 | A1* | 6/2004 | Lavender et al. ............ 713/202 |
| 2004/0267670 | A1 | 12/2004 | Minyailov |
| 2005/0055352 | A1* | 3/2005 | White et al. .................. 707/10 |
| 2005/0055354 | A1* | 3/2005 | Thompson et al. ........... 707/100 |
| 2005/0060397 | A1 | 3/2005 | Barthram et al. |
| 2005/0065977 | A1* | 3/2005 | Benson et al. ............. 707/104.1 |
| 2005/0102299 | A1 | 5/2005 | Mair et al. |
| 2006/0031264 | A1 | 2/2006 | Bosworth et al. |
| 2006/0074925 | A1 | 4/2006 | Bixby et al. |
| 2006/0080354 | A1 | 4/2006 | Berger et al. |
| 2006/0242443 | A1* | 10/2006 | Talius et al. .................. 713/400 |
| 2006/0253501 | A1* | 11/2006 | Langan et al. ................. 707/201 |
| 2006/0277223 | A1* | 12/2006 | Gupta et al. .................. 707/201 |
| 2007/0041571 | A1 | 2/2007 | Chatterjee et al. |
| 2007/0083569 | A1 | 4/2007 | Wong et al. |
| 2007/0220029 | A1* | 9/2007 | Jones et al. ................... 707/101 |
| 2007/0294236 | A1 | 12/2007 | Vaughan et al. |
| 2008/0005188 | A1 | 1/2008 | Li et al. |
| 2008/0021913 | A1 | 1/2008 | Tatavu et al. |
| 2008/0049971 | A1 | 2/2008 | Ramos et al. |
| 2008/0147745 | A1 | 6/2008 | Wilkinson et al. |
| 2008/0208920 | A1 | 8/2008 | Stirbu et al. |
| 2008/0263640 | A1 | 10/2008 | Brown |
| 2008/0307246 | A1* | 12/2008 | Rahman et al. ............... 713/400 |
| 2009/0063494 | A1 | 3/2009 | Amies et al. |
| 2009/0070388 | A1 | 3/2009 | Kolke et al. |
| 2009/0138609 | A1 | 5/2009 | Anderson et al. |
| 2009/0198835 | A1* | 8/2009 | Madhusudanan et al. .... 709/248 |
| 2009/0248713 | A1* | 10/2009 | Park et al. ..................... 707/100 |
| 2009/0254392 | A1 | 10/2009 | Zander |
| 2009/0300071 | A1* | 12/2009 | Arcese et al. ................. 707/201 |
| 2010/0122304 | A1 | 5/2010 | Scott, III |
| 2010/0322466 | A1 | 12/2010 | Sharma |
| 2011/0158260 | A1 | 6/2011 | Piwonka et al. |
| 2011/0264865 | A1 | 10/2011 | Mobarak et al. |

OTHER PUBLICATIONS

Vilcinskas et al., "Provisioning Based on Group Memberships", ILM 2007 Design Concepts Guide, Feb. 2008, 37 pages.*
Microsoft article, "How to poll for object attribute changes in Active Directory on Windows 2000 and Windows Server 2003", May 2007, 4 pages, accessed online at <http://support.microsoft.com/kb/891995> on Mar. 21, 2013.*
Wikipedia, "Watermark (data synchronization)", 2013, 2 pages, accessed online at <http://en.wikipedia.org/wiki/Watermark_(data_synchronization)> on Mar. 21, 2013.*
Shenk, Stephanie, "Directory Synchronization Failure on Large Distribution Groups", posted Sep. 9, 2009, 2 pages, accessed online at <http://blogs.technet.com/b/msonline/archive/2009/09/09/directory-synchronization-failure-on-large-distribution-groups.aspx>.
Oracle Data Sheet, "Oracle Directory Service Plus", copyright 2010, 4 pages, accessed online at <http://www.oracle.com/us/products/middleware/identity-management/oracle-directory-services/directoryservicesplus-ds-404374.pdf>.
Oracle, "Chapter 11 Directory Server Groups and Roles", Sun Directory Server Enterprise Edition 7.0 Reference, copyright 2010, 6 pages, accessed online at <http://docs.oracle.com/cd/E19424-01/820-4811/ganxy/index.html>.
Kian01, "Retrieve Names from Nested AD Groups", posted Jun. 26, 2008, 3 pages, accessed online at <http://www.codeproject.com/Articles/27281/Retrieve-Names-from-Nested-AD-Groups>.
HP ProCurve, "Synchronizing ProCurve IDM and Windows Active Directory", An HP ProCurve Networking Application Note, Jul. 2008, 10 pages, accessed online at <http://h17007.www.1hp.com/docs/interoperability/Microsoft/4AA2-1623EEE.pdf>.
Vilcinskas et al., "Provisioning Based on Group Membership", ILM 2007 Design Concepts Guide, Feb. 2008, 37 pages, accessed online at <download.microsoft.com/download/c/.../miis32_dc_groupprov.doc>.
Citrix, "Configuring LDAP Nested Group Extraction", Aug. 27, 2009, 1 page, accessed online at <http://support.citrix.com/proddocs/topic/access-gateway-91/agee-authorize-config-nested-ldap-tsk.html>.
Installation Guide, "Install the BlackBerry Directory Sync Tool", 2012, 3 pages, accessed online at <http://docs.blackberry.com/en/admin/deliverables/25802/Install_BB_Directory_Synch_1562981_11.jsp>.
M. Ali, "Token Bloat Troubleshooting by Analyzing Group Nesting in AD", Sep. 4, 2009, 6 pages, accessed online at <http://blogs.msdn.com/b/adpowershell/archive/2009/09/05/token-bloat-troubleshooting-by-analyzing-group-nesting-in-ad.aspx>.
Mike Kline, "Find Nested Group Members", My Blog about Active Directory and everything else, Jun. 24, 2009, 7 pages, accessed online at <http://adisfun.blogspot.com/2009/06/find-group-members.html>.
PowerShellCommunity.org, "Listing Users in Nested Groups", 2008, 3 pages, accessed online at <http://www.powershellcommunity.org/Forums/tabid/54/aft/3404/Default.aspx>.

* cited by examiner

APPARATUS, AND ASSOCIATED METHOD, FOR SYNCHRONIZING DIRECTORY SERVICES

CROSS-REFERENCE TO RELATED APPLICATIONS

This application is a continuation of U.S. patent application Ser. No. 12/766,878 filed on Apr. 24, 2010, now U.S. Pat. No. 8,290,900, the contents of which are incorporated herein by reference.

The present disclosure relates generally to a manner by which to synchronize a source directory service with a destination directory service. More particularly, the present disclosure relates to an apparatus, and an associated methodology, by which to synchronize directory services in which the scope of synchronization is based upon group membership.

De-nesting of nested groups is performed, and updating of a destination directory service is performed using directory objects of the de-nested groups.

BACKGROUND

Business, and other, enterprises make use of directory services related to enterprise operations. Directory services are created and maintained for various purposes within the enterprise. More generally, a directory service is a software system that stores information. A directory service is typically configured in a manner so that the stored information can readily be looked-up. While a directory service is used to store any of many varied types of information, a common usage of a directory pertains to the storage and retrieval of user identities for the purpose of authentication and authorization.

An existing protocol, referred to as LDAP (Lightweight Directory Access Protocol), is a frequently-used protocol by which to query and to update information in a directory. Entries stored in the directory are referred to as objects or members. Each object has an associated set of named attributes/value pairs.

An Active Directory™ (AD) is an example of a LDAP directory service that stores identity, and other, information. Examples of directory services sometimes used by an enterprise include a directory service used to store employee payroll information and a directory service used to store email information. The different directory services sometimes store the same identity information, such as the first and last name of enterprise personnel. That is to say, the different directory services sometimes contain common identity information. A directory service is sometimes created through keyboard entry of the identity information and other associated information of the directory service. When there are large numbers of objects, the entry of the required information quickly becomes a time-consumptive operation. The objects of the directory services are susceptible to change over time, and the directory services must be updated to reflect the changes. For example, when existing personnel depart an enterprise or additional personnel become part of the enterprise, the directory services must be updated to reflect the changes.

Directory synchronization services are available that provide for the sharing of the common identity information and subsequent synchronization of the common information due to changes in the objects. A directory synchronization service, sometimes software-implemented, functions to aggregate and to synchronize identity information between the multiple directory services. When, for example, two directory services are connected by a directory synchronization service and a new identity is created at one of the directory services, the directory synchronization service functions automatically to create an equivalent identity in the other of the directory services. Analogously, when an existing identity is deleted from one of the directory services, the directory synchronization service functions automatically to delete the corresponding identity in the other of the directory services. And, when an attribute of an identity changes in one of the directory services, the directory synchronization service functions automatically to update the value of the attribute for the corresponding identity of the other directory service.

A complicating factor in directory synchronization service operation is that in some situations, not every identity in each of the directory services should be synchronized with one another. By way of an example, in an enterprise, sometimes, only a portion of the enterprise personnel are granted email privileges. In a directory synchronization service that synchronizes an email directory service with a directory service that includes the entire, enterprise personnel, the directory synchronization service should not synchronize all of the objects of both of the directory services. A directory synchronization service, in a scenario such as this, must provide a mechanism by which to define an appropriate set of identities that are to be synchronized between directory services by the directory synchronization service. This is sometimes referred to as the scope of synchronization. LDAP directory services sometimes establish the scope of synchronization by designating an attribute to be of a particular value. For example, a directory synchronization service is sometimes configured to synchronize all users that have an email address. In this example, the scope of synchronization is defined by an LDAP search filter "mail=*" used in the synchronization operation to distinguish between personnel that have an email address and personnel that do not have an email address.

Directory services also sometimes store information about groups. A group is a directory object that has a multi-value attribute to represent membership. Existing directory synchronization services are generally unable to establish a scope of synchronization using group membership as membership in a group is an attribute of the group, not the member. Also, group membership is nestable, and a single group can contain members that belong to more than one directory service.

It is in light of this background information related to directory synchronization services that the significant improvements of the present disclosure have evolved.

DETAILED DESCRIPTION

The present disclosure, accordingly, advantageously provides an apparatus, and an associated methodology, by which to synchronize a source directory service with a destination directory service.

Through operation of an embodiment of the present disclosure, a manner is provided by which to synchronize directory services in which the scope of synchronization is based upon group membership.

In one aspect of the present disclosure, de-nesting of nested groups is performed, and updating of a destination directory service is performed using directory objects of the de-nested groups.

In another aspect of the present disclosure, group membership establishes the scope of synchronization for a directory synchronization service to synchronize objects of one directory with another directory. By establishing the scope of synchronization based upon group membership, a system administrator is able merely to add an identity to the group in the source directory, which automatically causes creation of the added identity in the destination directory pursuant to synchronization of the directory services. And, when an identity is to be removed, the system administrator merely removes the identity from the special group in the source directory, thereby automatically to delete the identity from the destination directory pursuant to synchronization operations.

In another aspect of the present disclosure, a manner is provided by which to synchronize objects of an LDAP directory service based upon group membership. Group-based synchronization to an LDAP directory service, such as ACTIVE DIRECTORY (AD) is performed. In one implementation, the directory synchronization service synchronizes the LDAP directory service, such as ACTIVE DIRECTORY with a destination directory positioned at an application mobile device servicing system positioned in communication connectivity with a mobile device of a mobile radio communication system. Although ACTIVE DIRECTORY, a commercial implementation of a directory service, is mentioned herein, the subject matter of this disclosure could be used in conjunction with any appropriate directory service, including but not limited to directory services complying with the LDAP protocol.

In another aspect of the present disclosure, the directory synchronization service provides for full-scan synchronization. In a full-scan synchronization, the directory synchronization service carries out a complete resynchronization of all objects within the scope of the synchronization from the source directory service to the destination directory service. Pursuant to a full-scan synchronization operation, all of the objects within the scope of the synchronization are fetched from a source directory service and used to update a destination directory service. At the end of a full-scan synchronization, a high watermark associated with a directory service is ascertained and stored.

In another aspect of the present disclosure, delta-scan synchronization is provided. In a delta-scan synchronization operation, a partial resynchronization of directory services is performed. In a partial resynchronization operation, only objects that are within the scope of the synchronization and that have changed in the source directory since a previous synchronization operation are updated at the destination directory service. A delta-scan synchronization makes use of high watermarks, which indicate current points of synchronization. Subsequent to each delta-scan synchronization operation, a high watermark associated with a directory service is ascertained and stored. This value of the high watermark is stored and subsequently accessed, used for a starting point in the determination of subsequent changes to objects of the source directory service.

In another aspect of the present disclosure, a scope of synchronization is utilized pursuant to the synchronization operations performed by a directory synchronization service. The scope of synchronization includes synchronization scope information, such as scope group information and nesting level information. The scope group information identifies a group in the source directory service that is used to establish the scope of synchronization by membership in the group. And, the nesting level information identifies the nesting level, i.e., the number of levels of nested group membership that are to be within the scope of synchronization.

In another aspect of the present disclosure, full-scan synchronization operations are performed responsive to a scan initiation, such as that initiated by a control element forming a scan initiator. The scan is initiated automatically, such as at timed intervals or responsive to another triggering event. The scan is dependent upon the synchronization scope, which is defined, e.g., by identification of a scope group and identification of the nesting level, in the example implementation, an integer value. The synchronization scope, in one implementation, includes more than one scope group. For each scope group, all nested groups, to the specified nesting level, are retrieved and stored, sorted by the domain to which the groups belong. Then, the unique name, or other identity, of every object within the synchronization scope is retrieved. The identity is obtained by iterating over each de-nested scope group of each domain. The retrieved identities are sorted by domain and stored. Then the stored values are used to update the destination directory service.

In another aspect of the present disclosure, delta-scan synchronization operations are performed starting at directory service locations identified by previous high watermarks of each directory service. Nested groups, to the specified nesting level, are retrieved and stored, sorted by the domain to which the groups belong. And, for each scope group, changed members are retrieved, sorted, and stored. These changed identities are used to update the destination directory.

Inter alia, the operation of de-nesting upon nested groups to a specified level of nesting, pursuant to the synchronization operation, makes possible the synchronization based upon group membership.

In these and other aspects, therefore, an apparatus, and an associated method, is provided for facilitating directory synchronization of a first set of source directory services with a corresponding set of destination directory services in accordance with a synchronization scope. Directory object groups are nestable. A group fetcher is configured to fetch, responsive to initiation information, and to de-nest each nestable group of nestable directory objects within the synchronization scope. An object fetcher is configured to fetch an identification of directory objects of each de-nested group of directory objects fetched and de-nested by the group fetcher.

Figure 1:
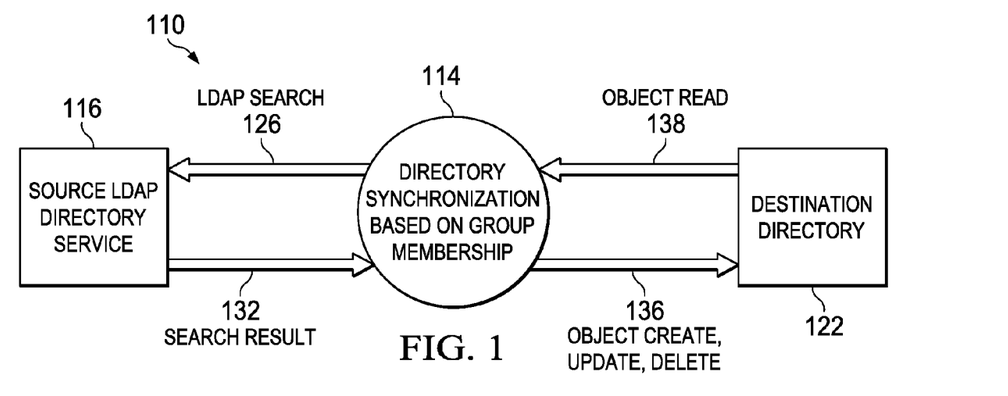
FIG. 1 illustrates a scheme including a directory synchronization service of an embodiment of the present disclosure.

Referring first to FIG. 1, an example scheme, shown generally at 110, functionally illustrates a directory synchronization service 114 that operates to synchronize objects of a first set of source directory services 116 with a corresponding set of destination directory services 122. A single source directory service 116 and a single destination directory service 122 are shown in FIG. 1 for purposes of simplicity. The sets of directory services 116 and 122 in other example implementations comprise multiple numbers of directory services.

The directory synchronization service synchronizes objects of the source directory service 116, which are within the scope of the synchronization, with corresponding objects of the destination directory service 122. The source directory 116 here forms an LDAP directory service that provides an LDAP interface with the directory synchronization service 114. In operation, the directory synchronization service causes an LDAP search, indicated by arrow 126 to be performed and results to be provided, indicated by the segment 132, by the source directory service to the directory synchronization service. Once obtained, the directory synchronization service updates the destination directory with object creations, deletions, and updates, indicated by the arrow 136. Object read indications are returned, indicated by the segment 138, by the destination directory to the directory synchronization service. Although LDAP directory services are mentioned herein by way of example, the subject matter of this disclosure could be applied to any appropriate directory services or collections thereof that provide synchronization among source and destination directory services.

The directory synchronization service provides synchronization based, inter alia, upon group membership, which permits ready identification of group members, thereby facilitating synchronization of the source and destination directories.

Figure 2:
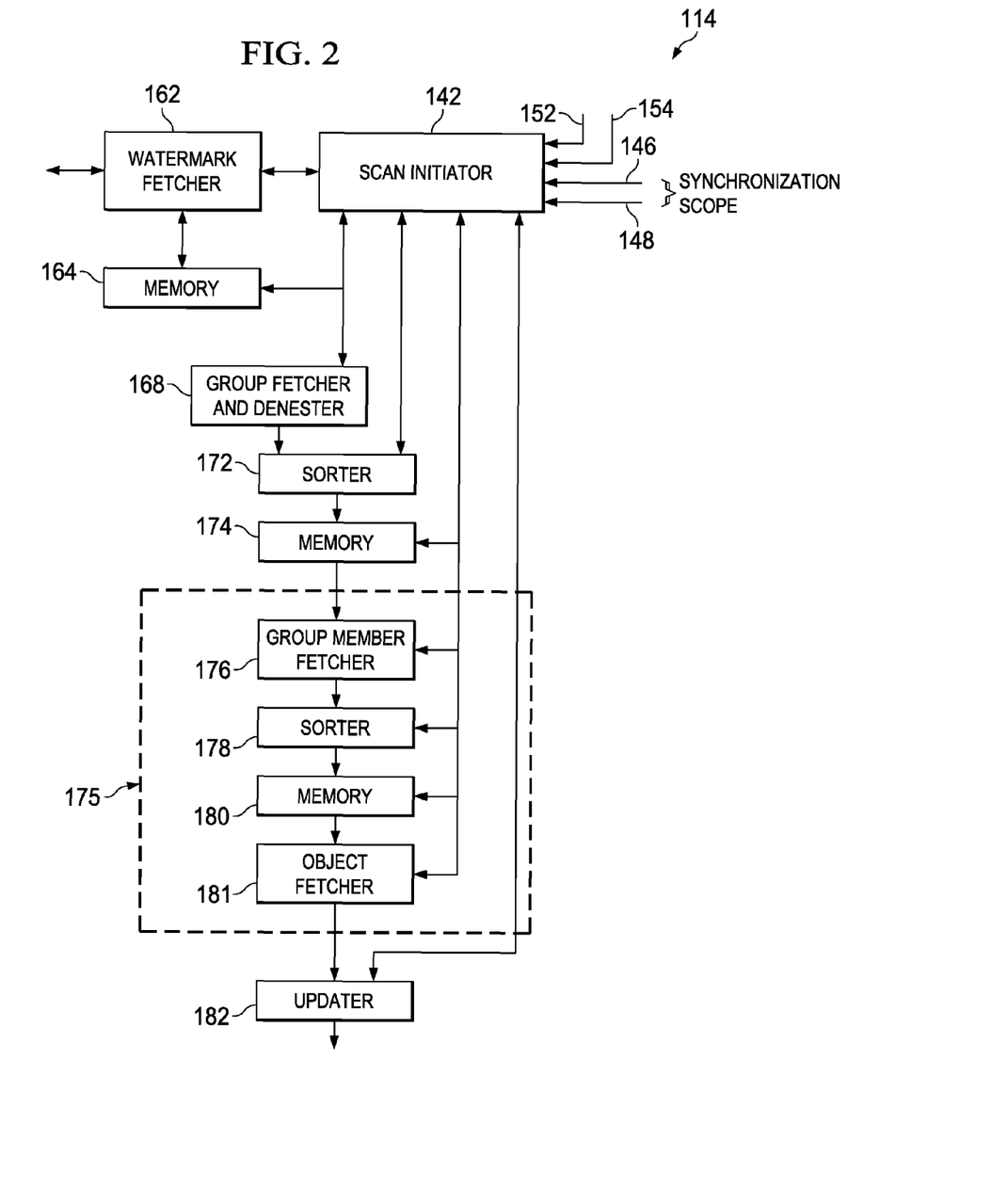
FIG. 2 illustrates a functional block diagram of a directory synchronization service apparatus of an embodiment of the present disclosure.

FIG. 2 illustrates the directory synchronization service 114, which, forms part of the scheme 110 in FIG. 1. The elements forming the directory synchronization service are implemented in any desired manner including a hardware implementation, a software implementation and in combinations thereof. The directory synchronization service is positionable to be in connectivity with both source directories and destination directories. A scan initiator 142 initiates synchronization operations and, in the example implementation, is provided with input information including synchronization scope information including, for instance, scope group information 146 and nesting level information 148, here an integer value. Additional input information includes identification of a synchronization type, i.e., a full-scan synchronization or a delta-scan synchronization 152 and a start indication 154.

Responsive to the input information, the scan initiator initiates synchronization operations. The directory synchronization service is here shown further to include a watermark fetcher 162, a memory element 164, a group fetcher and de-nester 168, a sorter 172, a memory element 174, an updater 182, and an object name fetcher 175 having a group member fetcher 176, a sorter 178, a memory 180, and an object fetcher 181.

The watermark fetcher 162 functions to fetch high watermarks for each source directory service from which synchronizations is to be performed. In general, a watermark describes an object of a predefined format that provides a point of reference for directory services to establish synchronization. Values of fetched watermarks are stored at the memory element 164.

The group fetcher and de-nester operates to fetch and de-nest all nested groups, to the specified nesting level 148 of the scope group or groups. Fetching operations are here controlled by the initiator 142, based upon the synchronization scope, and other, information. The group fetcher fetches the groups to the specified nesting level and the fetched groups are sorted by the sorter 172 and stored at the memory 174.

The object name fetcher 175 operates to fetch the identity, e.g., unique name, of the members of the de-nested groups that have been fetched, sorted, and stored at the memory element 174. The group member fetcher 176 retrieves the names (or another appropriate member identifier) of all members and retrieves the names (or another appropriate member identifier) of all of the members added and removed. The fetched member names are sorted by domain by the sorter 178 and then saved at the memory 180. The object fetcher 181 retrieves the named member objects from each domain and presents them to the updater 182. The fetched identities are provided to an updater 182 that functions to update corresponding groups of the destination directory service. The updater 182 also receives an input from a destination directory, analogous to the object read 138 indication shown in FIG. 1.

When the synchronization type comprises a full-scan synchronization, the object name fetcher 175 fetches all of the objects within the synchronization scope of the fetched, sorted, de-nested and stored groups. When the synchronization type comprises a delta-scan synchronization, the object name fetcher fetches changed objects, that is, objects that have changed attributes, new objects, and objects that have been deleted. In a delta-scan synchronization, a series of operations are carried out. First, the names of members added to and removed from de-nested scope groups are fetched. Then, these fetched names are sorted and stored by domain. Then, for each domain, the members that have been added are fetched and synchronized with a destination. Members that have been removed are handled as deletions from the destination directory server. Additionally, detection is made of members that have changed attributes are detected and their corresponding objects are updated at the destination directory.

Thereby, even though membership is an attribute of the group, not of the member, groups are nestable, and groups can contain members that belong to more than one directory service, the directory synchronization service 114 provides for synchronization based upon a group membership. Problems associated with conventional attempts to synchronize directory services based upon group membership are mitigated.

Figure 3A:
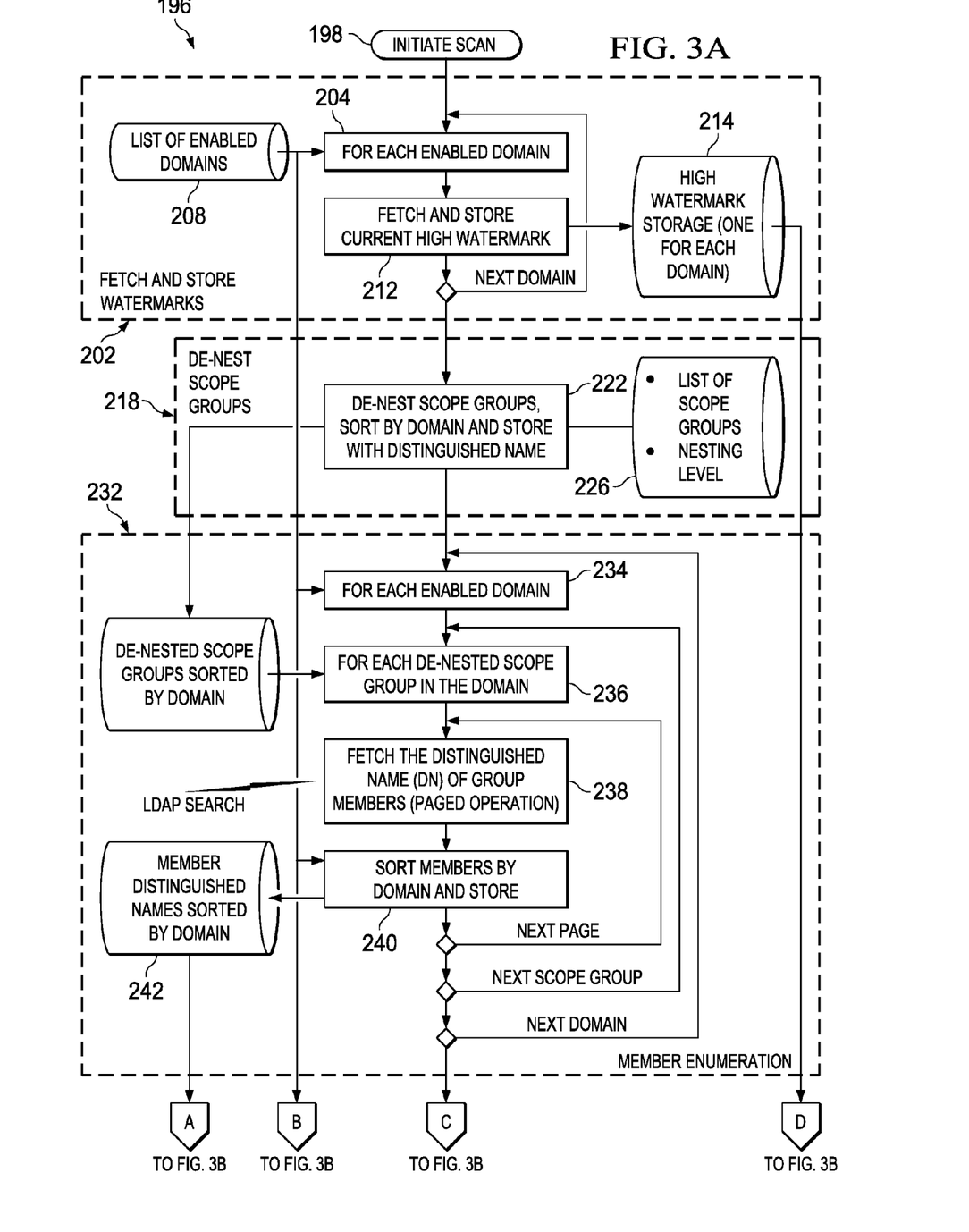
FIGS. 3A-3B illustrate a process diagram representative of the process of operation of an embodiment of the present disclosure.
Figure 3B:
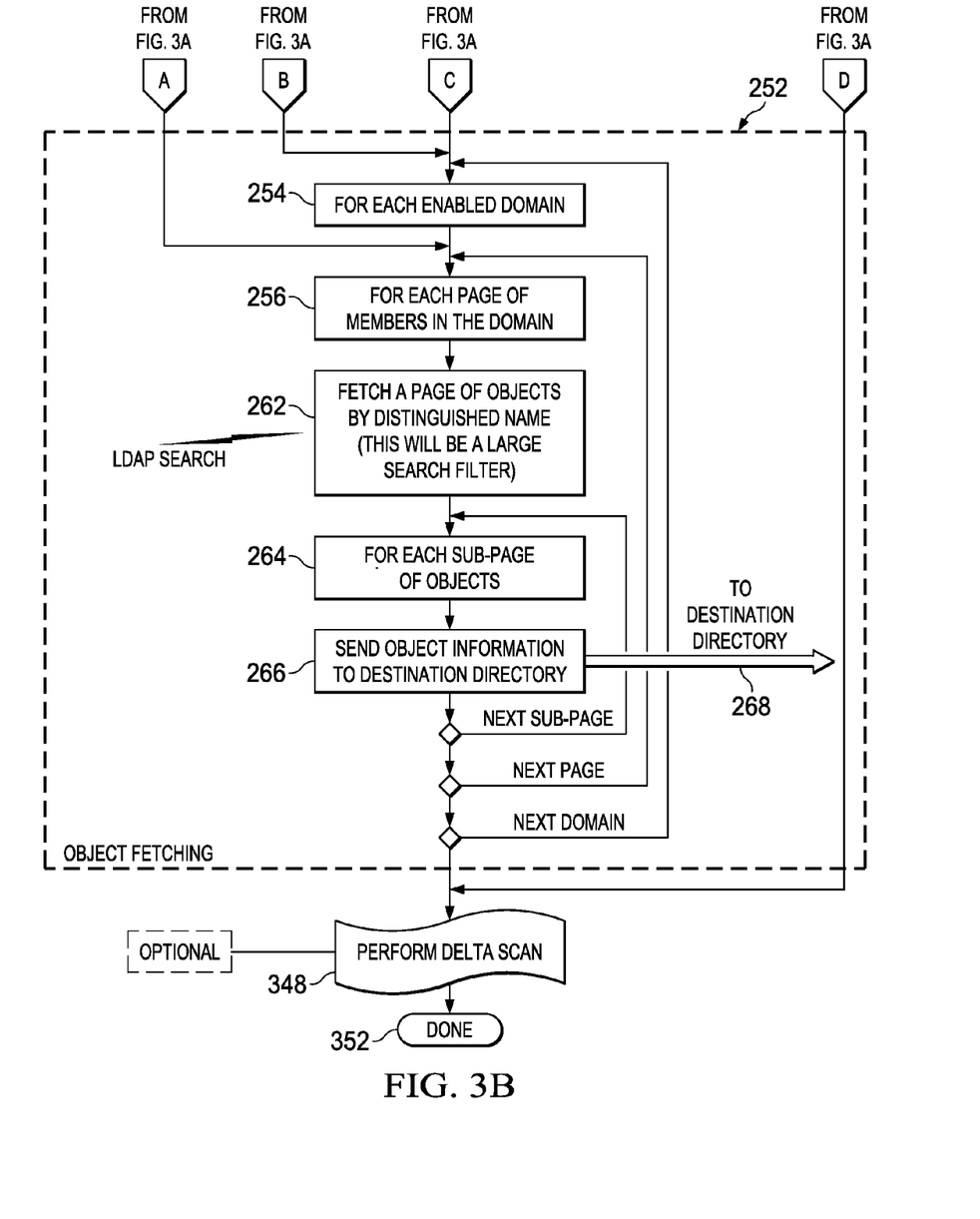

Turning next to FIGS. 3A-3B, a process diagram, shown generally at 196 shows an example full-scan synchronization process in a scenario having scoping groups over multiple domains, i.e., multiple directory services. Subsequent to start, indicated by the initiate scan block 198, watermarks are fetched and stored, indicated by the section 202. That is, for each enabled domain, indicated by the block 204, as known from the list of enabled domains 208, a high watermark is fetched and stored, indicated by the block 212. A high watermark is stored, indicated by the block 214 for each domain. As indicated by the portion 202, operation is iterative through all of the enabled domains.

At portion 218, the scope groups are de-nested. The scope groups are de-nested, as indicated by the block 222, sorted by domain, and stored with associated DN values. A DN (distinguished name) is or includes the name of the member. The DN also identifies the domain to which the member belongs. This enables sorting by domain. In performance of these operations, and as indicated by the block 226, the specified nesting level and the identification of the user scope groups are provided.

At the portion 232, member enumeration is performed. For each enabled domain, indicated by the block 234, and for each de-nested scope group in the domain, indicated by the block 236, the distinguished name (DN) of group members is fetched, as indicated by the block 238. This is a paged operation, in that the results of the LDAP search are typically received as some number of "pages" or groups containing a subset of matching records, with successive pages being serially obtained until all matching records have been received. Then, and as indicated by the block 240, members are sorted by domain and stored. Storage is indicated by the block 242. This process is iterative, as indicated by page, scope group, and domain.

At the portion 252, object fetching is performed. For each enabled domain, indicated by the block 254, and for each page of members in the domain, indicated by the block 256, a page of objects by DN is fetched, indicated by the block 262.

And, for each sub-page of objects, indicated by the block 264, the object is sent to the destination directory, indicated by the block 266 and the arrow 268. Here also, the portion 252 is iterative by sub-page, page, and domain. Portions 232 and 252 are iterated or repeated for as many different directory object types as desired.

FIG. 3A-3B also illustrate optional performance of a subsequent delta-scan, indicated by the block 348. A delta-scan synchronization might be performed to synchronize for changes made to the source directory service subsequent to the full scan synchronization. And, thereafter, the process is finished, indicated by the done block 352.

Figure 4A:
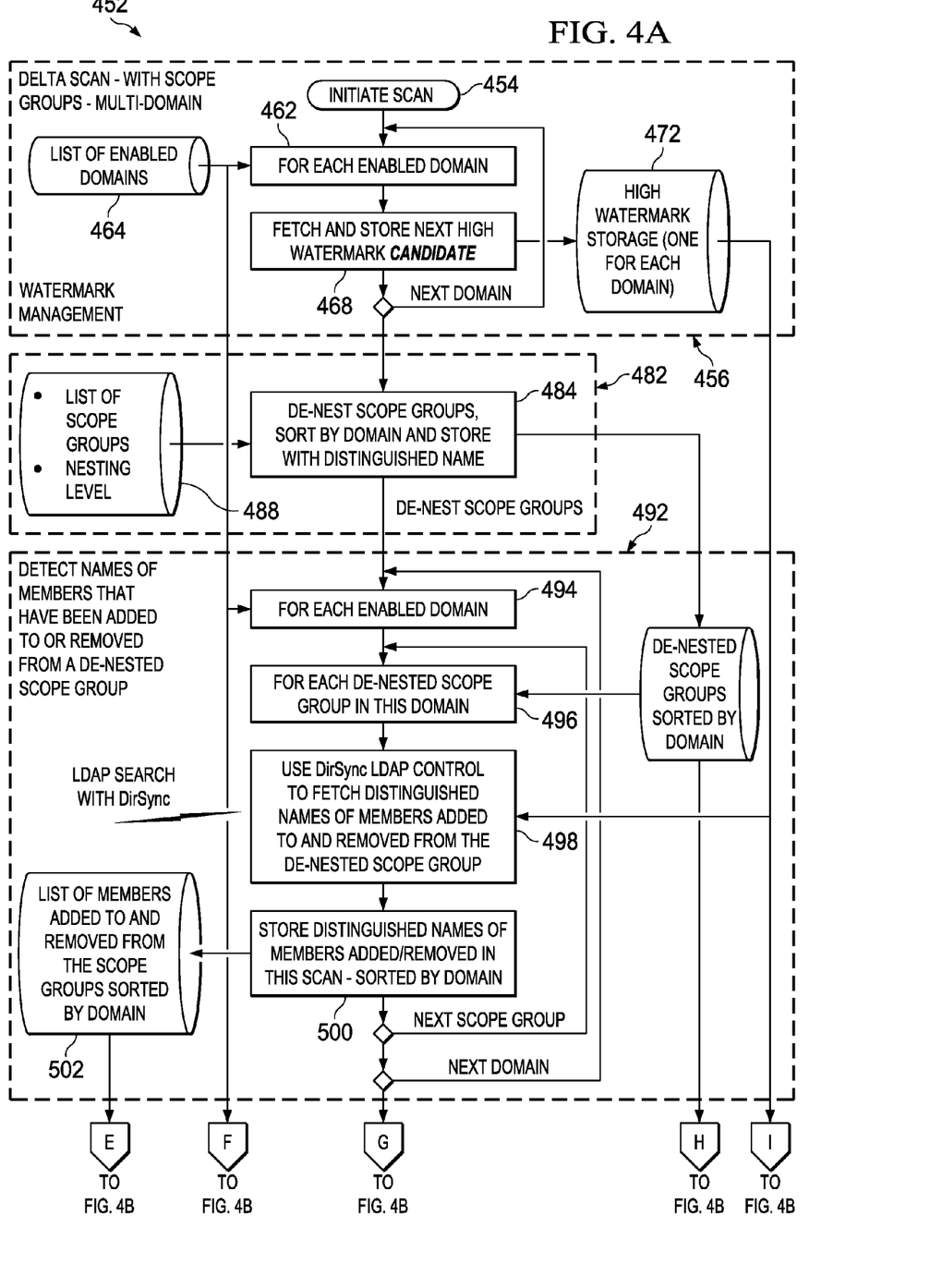
FIGS. 4A-4C illustrates a process diagram, similar to that shown in FIGS. 3A-3B, but representative of alternate, example operation of an embodiment of the present disclosure.
Figure 4B:
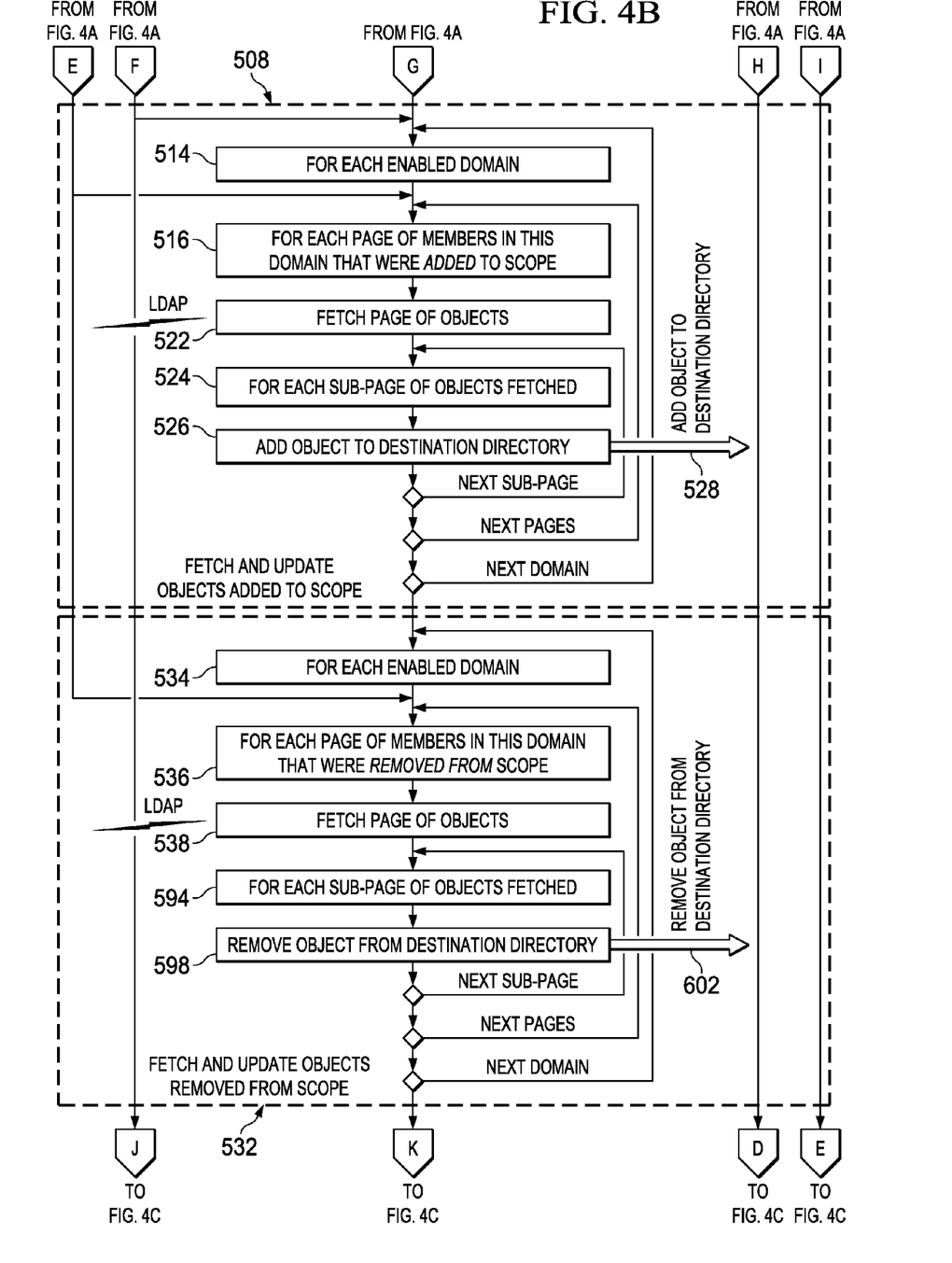
Figure 4C:
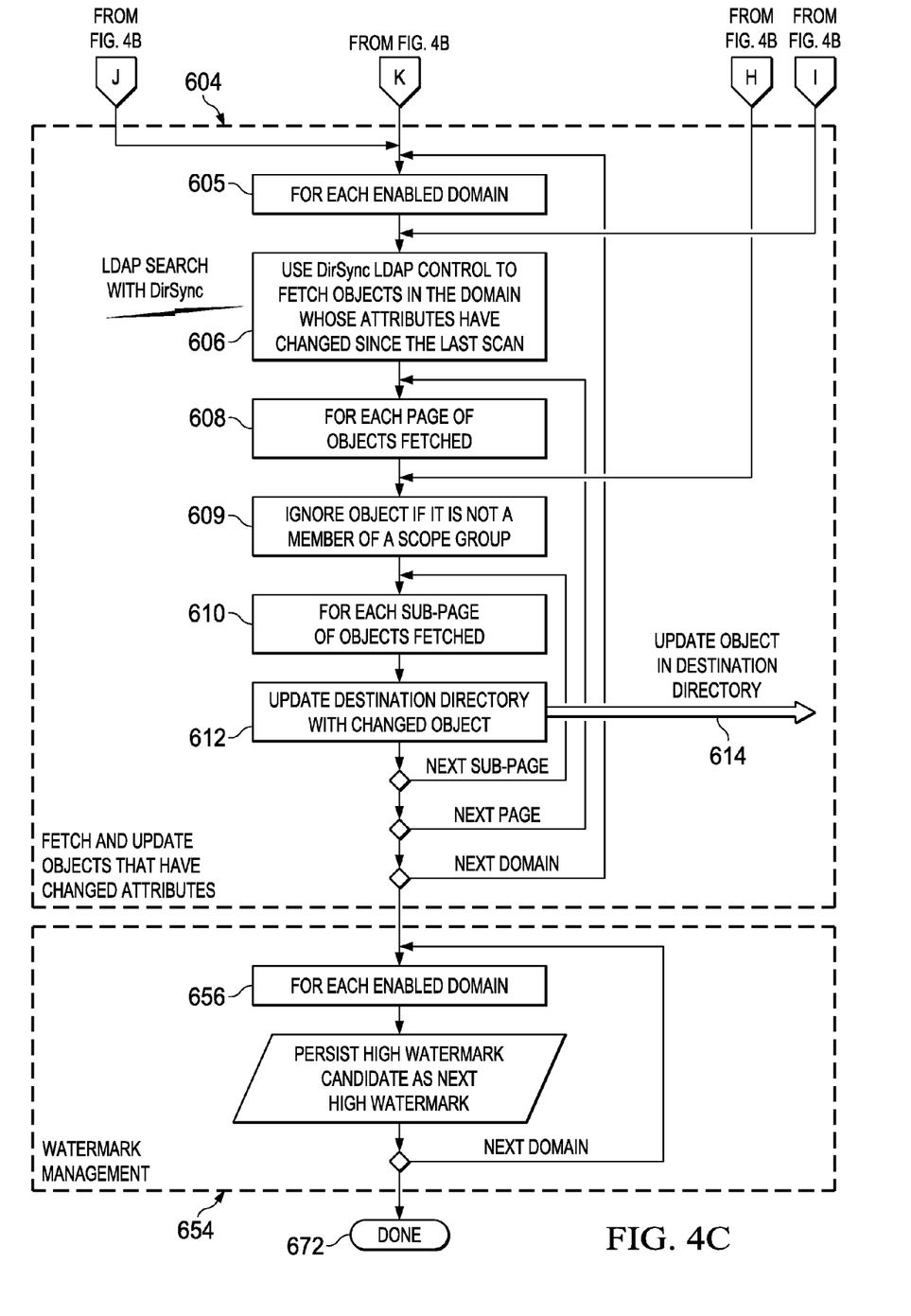

FIGS. 4A-4C illustrate a process, shown generally at 452, representative of delta-scan synchronization over multiple domains with scoping groups.

Subsequent to start, indicated by the initiate scan block 454, water-mark management is performed at the portion 456. For each enabled domain, indicated by the block 462, using a list 464 of enabled domains, a next high watermark candidate is fetched and stored, indicated at the block 468. Storage is indicated at the block 472.

At the portion 482, scope groups are de-nested. The scoping groups are, indicated by the block 484, de-nested, sorted by domain, and stored with DN making use of user scope groups and specified nesting levels, indicated by the block 488.

At the portion 492, names of members that have been added to or removed from a de-nested scope group are detected. For each enabled domain, indicated by the block 494 and for each de-nested scope group in the domain, indicated by the block 496, DirSync LDAP control is used to fetch DNs of members added to, and removed from, the de-nested scope group. This is indicated at the block 498. Then, and as indicated by the block 500, DNs of members added to or removed from the de-nested scope group in the scan are stored, sorted by domain. And, a list of members added to and removed from the scope groups, sorted by domain are indicated as being stored at the block 502.

At portion 508, object fetching and updating of objects added to scope are performed. For each enabled domain, indicated by the block 514, and for each available page of members in the domain that were added to scope, as indicated by the block 516, a page of objects is fetched, indicated by the block 522. Then, for each sub-page of objects fetched, indicated by the block 524, corresponding objects are added to the destination directory, indicated by the block 526 and the arrow 528. The portion 508 is iterative by sub-page, pages, and domain.

At portion 532, objects removed from scope are fetched. For each enabled domain, indicated by the block 534, and for each available page of members in this domain that were removed from scope, indicated by the block 536, the page of objects is fetched, indicated by the block 538. Then, for each sub-page of fetched objects, indicated by the block 594, corresponding objects are removed from the destination directory, indicated by the block 598 and the arrow 602. The portion 532 is iterated by sub-page, page, and domain.

At portion 604, objects that have changed attributes are fetched and updated. For each enabled domain, indicated by the block 605, DirSync LDAP control is used, indicated by the block 606, to fetch objects in the domain whose attributes have changed since the last scan. Then, for each page of fetched objects, the objects are taken in turn as indicated by the block 608. As indicated by the block 609, if an object is not a member of a scope group, it is ignored. Then, for each sub-page of fetched objects which are members of a scope group, the destination directory is updated with the changed objects, as indicated by blocks 610 and 612 and arrow 614. At the portion 654, watermark management is performed. For each enabled domain, indicated by the block 656, the respective high watermark candidate earlier fetched and stored in block 468 is persisted as the next high watermark for that domain. This portion 654 is iterative by domain.

Then, as indicated by the done block 672, the process ends.

Figure 5:
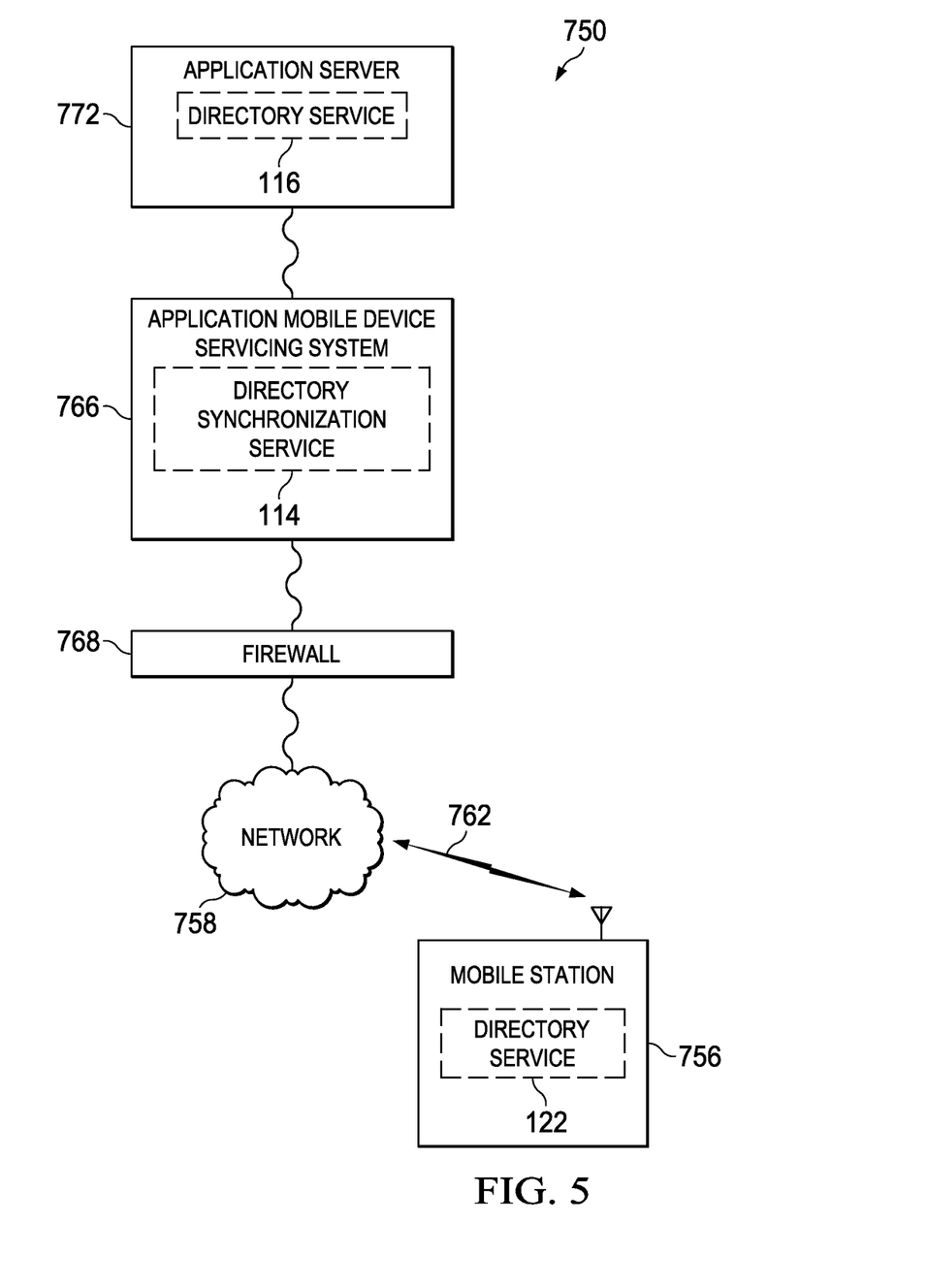
FIG. 5 illustrates an example system in which the directory synchronization service apparatus shown in FIG. 1 forms a portion.

FIG. 5 illustrates an example communication system, shown generally at 750, in which an embodiment of the present invention forms a portion. The communication system 750 forms a mobile communication system and includes a mobile station 756 that is positionable in communication connectivity with a network 758 by way of a radio air interface 762. Communication entities are connected to the network entity 758, here including an application mobile device servicing system 766 positioned behind an optional firewall 768. An application server 772 is also shown in the figure, positioned in connectivity with the servicing system 766. The communication system 750 is by way of example only; an embodiment of the present invention is analogously implementable in any of various other communication systems.

The servicing system 766 includes the directory synchronization service 114. The synchronization service, in this example, operates to perform synchronization of directory services, here positioned at the server 772 and the mobile station 756. For purposes of example, a source directory service 122 is shown to be formed at the mobile station and a destination directory service 116 is embodied at the server 772. Operation in which the source directory service is embodied at the server 772 and the directory destination service is embodied at the mobile station 756 can be analogously represented.

Thereby, a manner is provided by which to synchronize directory services on a group basis that overcomes the problems associated with the existing art.

Presently preferred embodiments of the disclosure and many of its improvements and advantages have been described with a degree of particularity. The description is of preferred examples of implementing the disclosure, and the description of examples is not necessarily intended to limit the scope of the disclosure. The scope of the disclosure is defined by the following claims.

What is claimed is:

1. An apparatus that facilitates a directory synchronization of a first set of source directory services with a corresponding set of destination directory services, said apparatus comprising:
   a watermark fetcher configured to fetch a watermark reference for each destination directory service upon which a synchronization is to be performed;
   a group fetcher and de-nester configured to fetch and to de-nest group members to a nesting level within a synchronization scope which identifies a group and the nesting level;
   a memory configured to store fetched group members fetched and de-nested by said group fetcher and de-nester;
   an object name fetcher configured to fetch identifications of changed directory objects of each group member fetched by said group fetcher and de-nester within the synchronization scope that are above the watermark references for each destination directory service; and
   an updater configured to update the corresponding group members of destination directory services.

2. The apparatus of claim 1, wherein:
   the watermark references fetched by said watermark fetcher are stored in the memory.

3. The apparatus of claim 2, wherein:
said object name fetcher is configured to fetch an identification of each directory object of each de-nested group fetched and de-nested by said group fetcher and de-nester.

4. The apparatus of claim 1, wherein:
said updater is configured to update the corresponding set of destination directory services responsive to fetching by said object name fetcher of the identifications of changed directory objects of each group member.

5. The apparatus of claim 4 wherein:
said updater is configured to update the corresponding set of destination directory services by creating additional member objects.

6. The apparatus of claim 4 wherein:
said updater is configured to update the corresponding set of destination directory services by deleting removed member objects.

7. The apparatus of claim 1, wherein:
each destination directory service is configured to store member objects according to a Lightweight Directory Access Protocol (LDAP).

8. The apparatus of claim 7, wherein:
each member object has an associated set of attributes, and when an attribute of a member object changes in one of the destination directory services, the updater automatically updates the value of the attribute for the corresponding member object of each of the other destination directory services.

9. The apparatus of claim 8, wherein:
the synchronization scope is established by designating one of the set of attributes to be of a particular value.

10. The apparatus of claim 9, wherein the scope of synchronization is defined by an LDAP search filter that is used to distinguish between member objects.

11. The apparatus of claim 1, further comprising:
a scan initiator configured to generate a scan initiation; and
wherein the synchronization is performed responsive to the scan initiation.

12. The apparatus of claim 11, wherein:
the scan initiation is generated based on one of a timed interval or a triggering event.

13. The apparatus of claim 11, wherein:
the scan initiator initiates the synchronization and receives synchronization scope information;
wherein the synchronization scope information includes scope group information and nesting level information.

14. The apparatus of claim 1, wherein:
each of the destination directory services comprises multiple numbers of directory services.

15. A method for synchronizing a first set of source directory services with a corresponding set of destination directory services, comprising:
fetching a watermark reference for each destination directory service upon which a synchronization is to be performed;
establishing a scope of synchronization that encompasses at least one nested group and a nesting level, wherein each nested group includes one or more member objects;
fetching and de-nesting group members to the nesting level within the scope of synchronization;
storing fetched group members fetched and de-nested in the fetching and de-nesting;
fetching identifications of changed directory objects of each group member fetched in the fetching and de-nesting within the synchronization scope that are above the watermark reference for each destination directory service; and
updating the corresponding group members of destination directory services.

16. The method of claim 15, further comprising:
identifying changes to member objects of each source directory service;
accessing a stored watermark reference; and
using the stored watermark reference as a starting point in said identifying changes.

17. The method of claim 15, further comprising:
adding a member object in a selected one directory service of the first set of source directory services and thereby automatically creating the added member object in the selected one directory service of the corresponding set of destination directory services.

18. The method of claim 15, further comprising:
removing a member object from a selected one directory service of the first set of source directory services and thereby automatically deleting the removed member object from the selected one directory service of the corresponding set of destination directory services.

19. The method of claim 15, further comprising:
assigning a new member object to a group in a selected one directory service of the first set of source directory services; and
responsive to said assigning, updating the selected one directory service of the corresponding set of destination directory services by adding the new member object within the selected one directory service of the corresponding set of destination directory services.

20. A non-transitory computer readable medium having recorded thereon instructions for a directory synchronization of a first set of source directory services with a corresponding set of destination directory services that when executed cause a computer to carry out:
fetching a watermark reference for each destination directory service upon which a synchronization is to be performed;
fetching and de-nesting group members to a nesting level within a synchronization scope which identifies a group and the nesting level;
storing fetched group members fetched and de-nested by the fetching and de-nesting in a memory;
fetching identifications of changed directory objects of each group member fetched in the fetching and de-nesting within the synchronization scope that are above the watermark reference for each destination directory service; and
updating the corresponding group members of destination directory services.

* * * * *